US006055502A

United States Patent [19]

Kitamura

[11] Patent Number: 6,055,502
[45] Date of Patent: *Apr. 25, 2000

[54] ADAPTIVE AUDIO SIGNAL COMPRESSION COMPUTER SYSTEM AND METHOD

[75] Inventor: John S. Kitamura, Toronto, Canada

[73] Assignee: ATI Technologies, Inc., Thornhill, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/944,055

[22] Filed: Sep. 27, 1997

[51] Int. Cl.[7] .................................................. H04B 1/66
[52] U.S. Cl. ......................................... 704/500; 704/501
[58] Field of Search .................................. 704/500, 501, 704/502, 503, 504, 230, 229; 381/71.5, 71.11, 71.12, 106, 110

[56] References Cited

U.S. PATENT DOCUMENTS

| | | | |
|---|---|---|---|
| 4,064,364 | 12/1977 | Veale . | |
| 4,152,649 | 5/1979 | Choquet . | |
| 4,352,190 | 9/1982 | Hullwegen . | |
| 4,769,848 | 9/1988 | Eberbach . | |
| 4,910,779 | 3/1990 | Cooper et al. | 381/26 |
| 5,283,819 | 2/1994 | Glick et al. . | |
| 5,412,691 | 5/1995 | Ginzburg et al. . | |
| 5,438,623 | 8/1995 | Begault . | |
| 5,583,560 | 12/1996 | Floriin et al. . | |
| 5,594,509 | 1/1997 | Florin et al. . | |
| 5,602,928 | 2/1997 | Eriksson et al. . | |
| 5,677,994 | 10/1997 | Miyamori et al. | 704/504 |
| 5,682,463 | 10/1997 | Allen et al. | 704/230 |
| 5,737,389 | 4/1998 | Allen | 381/60 |
| 5,737,720 | 4/1998 | Miyamori et al. | 704/503 |
| 5,742,773 | 4/1998 | Blomfield-Brown et al. | 704/500 |
| 5,819,215 | 10/1998 | Dobson et al. | 704/500 |
| 5,873,065 | 2/1999 | Akagiri et al. | 704/500 |
| 5,909,664 | 6/1999 | Davis et al. | 704/229 |

*Primary Examiner*—David R. Hudspeth
*Assistant Examiner*—Martin Lerner
*Attorney, Agent, or Firm*—Markison & Reckamp, P.C.

[57] ABSTRACT

An adaptive audio signal compression computer system corrects multiple input audio streams, such as digital multichannel audio streams from various audio sources, for equalization deficiencies caused primarily by attenuation factors experienced by a listener's human ear. A compression stage (filter stage) adaptively compresses (filters) an input audio stream by selecting the ear response data that includes a plurality of selectable sets of filter coefficients wherein each set of filter coefficients corresponds to an inverse audible listening response curve for a predetermined audio volume level. When available from an audio source, the system provides audio source type data to an adaptive compression stage and also generates a compression control signal in response to the source type data to control the compression. Listening environment data is also used to generate control parameters for the compression stage so that compression can be dynamically varied based on changing surrounding environmental circumstances.

25 Claims, 6 Drawing Sheets

ADAPTIVE AUDIO SIGNAL COMPRESSION COMPUTER SYSTEM AND METHOD

BACKGROUND OF THE INVENTION

The invention relates generally to computer based audio control systems and more particularly to computer based audio control systems utilizing adaptive compression and adaptive filtering in multimedia computers.

With the proposal of increased video and audio applications in multimedia personal computers, a user can potentially use the computer to control the television, telephone and home stereo as well as connect signals from cable television links, satellite TV and various other video/audio sources such as compact disc (CD) players, VCRs and digital versatile disc (DVD) players to the home entertainment system. The variety of audio sources and differing formats requires measures to ensure suitable audio delivery. For example, audio from a telephone line will contain low resolution voice data. A DVD may provide a movie soundtrack. A broadcast TV signal may have a movie soundtrack with a compressed dynamic range. A CD may provide high-definition music. DVDs can be recorded in a plurality of different audio formats containing compressed audio or uncompressed audio and multichannel surround sound formats for theater entertainment systems. For example, a DVD disc may be recorded in 96 kHz, 44.1 kHz, 48 kHz, mono, stereo, multichannel, AC-3 encoded, MPEG-2 encoded, DTS encoded, SDDS encoded, HDCD encoded, and other formats. Each type and format of audio will have different characteristics and may require different compression and filtering which are not generally accommodated by conventional multimedia computers.

Some high-end home entertainment systems have multichannel audio systems, such as surround sound systems with three or more channels to provide theater sound effects. The surround sound channels are often presented at a lower volume level than front channels since movies contain most of the audio information in the front channels and use the surround channels sparingly as effects channels. A typical surround multichannel system may include six channels. These channels typically consist of a left, right and center front channel, a left and right surround channel and a subwoofer channel. Differing prerecorded equalization settings among surround channel recording or among the various formats can sound different on the same speakers.

When hearing sound, the human ear has a frequency response that typically attenuates certain frequency bands at lower and upper frequencies, for example below 200 Hz and above 10 kHz. Furthermore, this frequency response is not consistent over different volume levels. There is less attenuation in the low and high bands when the volume of the sound presented to the ear is increased. This leads to an inconsistent listening experience when listening to material at different volumes, especially when the material is created to be listened to at a specific volume level.

For example, it is not always suitable to listen to a movie at loud levels. Movies and television programming can be mixed for fairly loud listening environment and may sound very different at low volumes. The original mixing becomes more problematic with multichannel information. For instance, when playing a movie at a low volume, a listener can hear the loud dialog but whispers may often be inaudible. During television programs, when commercials are played, they can seem excessively loud because they are already compressed. Compression of channels can help even out levels but this will cause noticeable distortion in compression sensitive material such as music. Music or sound effects in surround channels of a multichannel system can also sound proper at loud volumes, but can obscure the vocal channel at low volumes. Therefore it would be advantageous to adaptively control compression and attenuation independently in each channel. Information in different frequency ranges do not attenuate in a consistent fashion due to the physical limitations of the ear, or the ear frequency response. Consequently turning down or reducing volume appears to attenuate low and high frequencies more than mid range frequencies.

Therefore there exists a need for an adaptive audio signal compression and attenuation computer system which can provide independent compression for each channel if desired. It would advantageous if such a system took into account the physical limitations of the ear to properly compress and filter received audio on a per channel basis.

BRIEF DESCRIPTION OF THE DRAWINGS

The features of the present invention together with the advantages thereof, may be understood by reference to the following description taken in conjunction with the accompanying drawings wherein.

DETAILED DESCRIPTION OF THE INVENTION

Generally, an adaptive audio signal compression computer system corrects multiple input audio streams, such as digital multichannel audio streams from various audio sources, for equalization deficiencies caused primarily by attenuation factors experienced by a listener's human ear. The system has memory containing selectable audio response filter data representing a plurality of predetermined ear response data. A compression stage (filter stage) adaptively compresses (filters) an input audio stream by selecting the selectable audio response filter data for use in varying audio signal compression parameters. As used herein, the term compression includes the operation performed by finite impulse response filters in a filtering stage to vary the magnitude of a given signal based on a frequency ofthat signal.

Preferably, the ear response data includes a plurality of selectable sets of filter coefficients wherein each set of filter coefficients corresponds to an inverse audible listening response curve for a predetermined audio volume level. An adaptive filter stage adaptively compresses the input audio stream by selecting the selectable audio response filter data for use in varying audio signal compression parameters. The compression is preferably carried out in part by an FIR filter stage that filters the input audio signal by selecting the selectable audio response filter data based on a given volume level. When available from an audio source, the system provides audio source type data to an adaptive compression stage and also generates a compression control signal in response to the source type data to control the compression. Listening environment data is also used to generate control parameters for the compression stage so that compression can be dynamically varied based on changing surrounding environmental circumstances.

Figure 1:
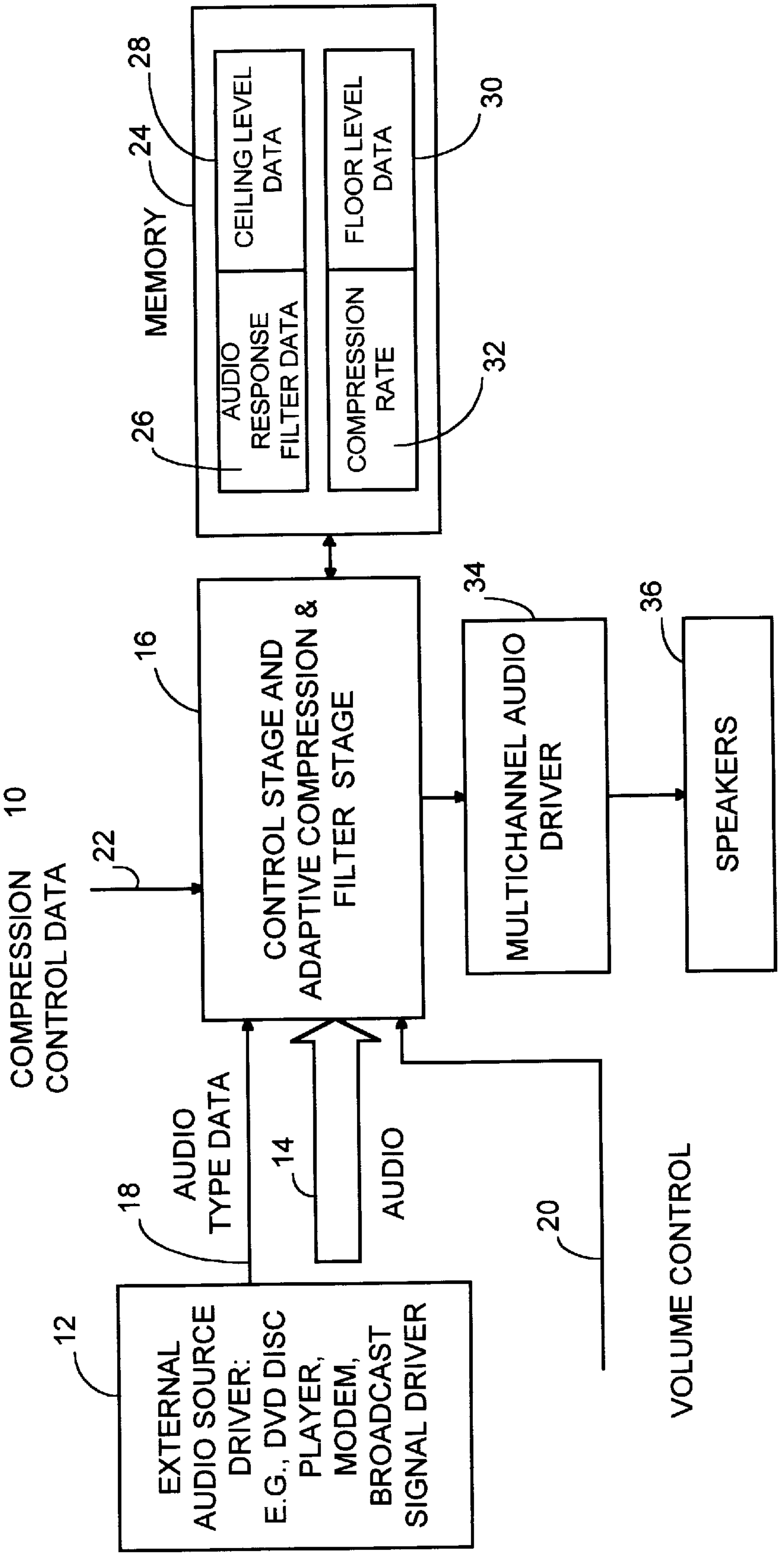
FIG. 1 is a block diagram generally depicting a portion of a multimedia computer system having an adaptive audio signal compression computer system in accordance with one embodiment of the invention.

FIG. 1 shows an adaptive audio signal compression computer system 10, such as portion of a multimedia computer system, having an external audio source driver 12, such as a DVD disc player, modem, television broadcast signal driver, or other audio source provider, which generates an input audio stream 14. The external audio source driver 12 may be a disc reader such as a conventional disc reader that reads header information as programmed on a CD, DVD or other disc. It will be recognized that the audio source driver 12 can be any audio medium reader including digital tape readers, television or audio broadcast signals, streaming audio or audio from an Internet connection, or any other suitable external audio source driver (or internal audio source such as stored audio file). A control stage 16 includes an adaptive compression and adaptive filter stage to adaptively compress the input audio stream 14 based on audio response filtered data derived from listening response curves. The control stage 16 and associated adaptive compression and adaptive filter stages are preferably software modules stored in an associated computer memory executed by a computing unit of a multimedia computer system. The control stage 16 receives audio type data 18 from the external audio source driver 12 which indicates the type of audio in the input audio stream 14. The audio type data 18 may include audio medium identification data such as identification number data that is stored in headers of conventional CDs and DVDs. For example, if the external audio source driver 12 is a DVD player, the audio type data indicates that the audio is recorded in a multichannel format.

The control stage 16 also receives volume control data 20 and compression control data 22 to facilitate adaptive compression, filtering and attenuation as further described below. The control stage 16 is in communication with memory 24 that contains selectable audio response filter data 26 for use in varying audio signal compression parameters. The memory 24 also contains compression ceiling level data 28 and compression floor level data 30 that is generated by the control stage 16 to set thresholds for the adaptive compression stage when compression or decompression is necessary. Memory 24 also includes compression rate data 32 which defines the rate at which compression is applied to a given channel of audio input.

The audio input stream 14 in the case of a multichannel digital audio system, may include six channels of audio where each audio channel is received by the control stage 16, processed and output to a multichannel audio driver 34. The multichannel audio driver 34 directs the processed audio streams for each channel to appropriate speakers 36.

The selectable audio response filter data 26 contains data representing sets of filter coefficients corresponding to a plurality of inverse audible listening response curves such as a family of Fletcher-Munson curves. The family of curves are a set of curves showing human ear sensitivity to loudness versus frequency. As known in the art, a human ear is most sensitive to sound in the 3 KHz to 4 KHz range such that sounds above and below 3 to 4 KHz must be louder in order to be perceived to be just as loud as other frequencies. The control stage 16 uses the selectable audio response filter data 26 to adjust filtering of the audio input stream 14 based on a given volume level as determined by volume control data 20. The selectable audio response filter data 26 is selectable by control stage 16 based on the volume level obtained from the volume control data 20.

Figure 2:
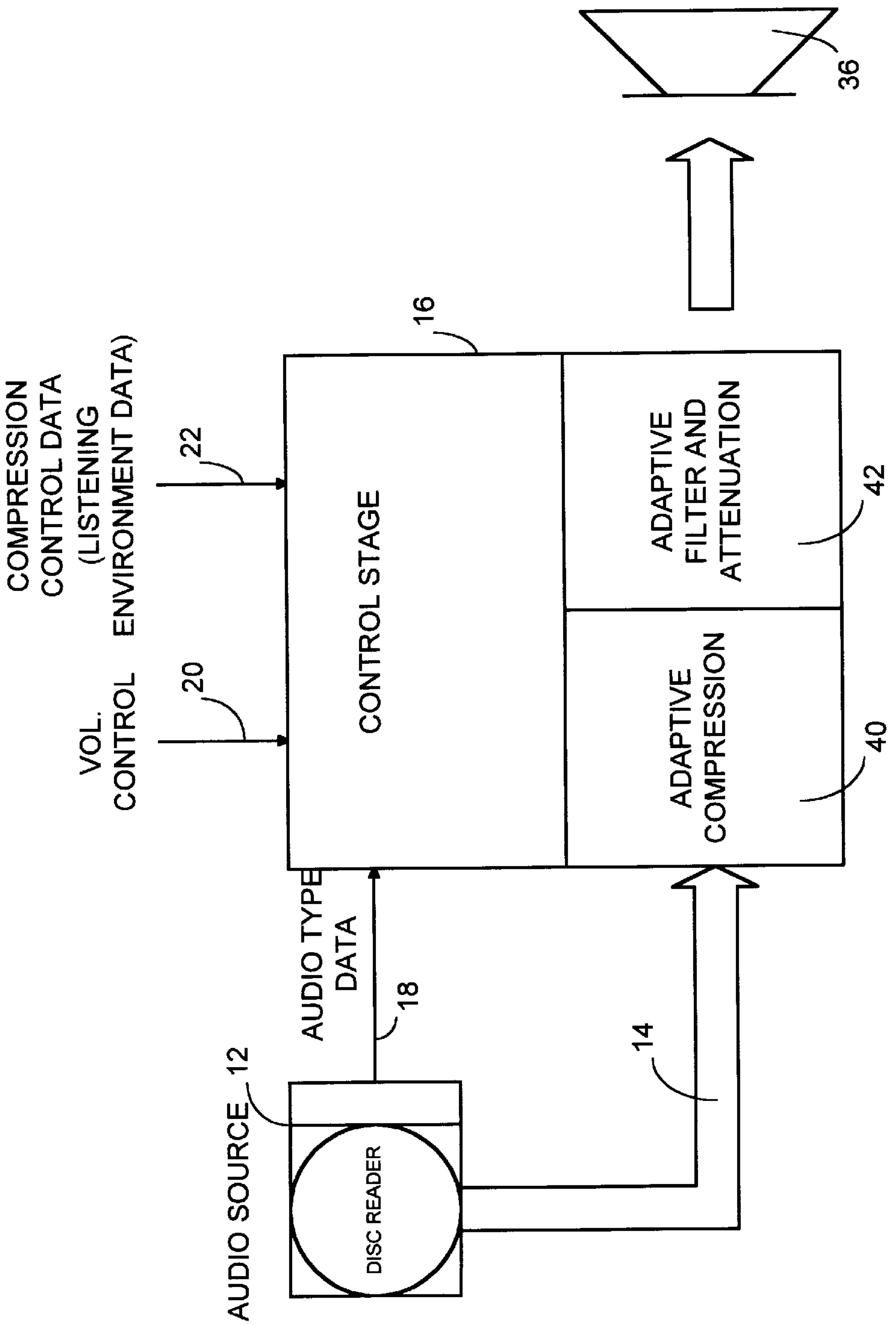
FIG. 2 is a block diagram generally depicting a control stage and an adaptive compression and filter stage for adaptively compressing an input audio stream in accordance with one embodiment of the invention.

FIG. 2 shows the control stage 16 having an adaptive compression stage 40 and an adaptive filter and attenuation stage 42. The adaptive compression stage 40 is not necessary when compression is not required such as for example where the input audio stream 14 is primarily voice data that has not undergone decompression. However, where compression is desirable, such as where the input audio stream 14 contains audio channels having music or movie audio in a multichannel system, the adaptive compression stage 40 determines a compression threshold level, such as a floor and ceiling level based on the compression control data 22.

The compression control data 22 is audio listening environment data that may be entered by a user through a software interface. The audio listening environment data represents, by way of example, the amount of background noise in a listening environment such as a room where the movie recorded on a DVD disc is being played back. For example, where there is a large amount of background noise in a room, a user sets the audio listening environment level to a high level through a graphic user interface. The high level indication is used by the adaptive compression stage 40 to set a high ceiling level for compression of the input audio stream 14. Similarly, if low background noise is present in a listening area, a user enters data representative of low level background noise so that the adaptive compression stage 40 can suitably adjust the compression thresholds to reduce compression since audio may be heard easier in an environment with lower background noise. The determined ceiling level data 28 and/or floor level data 30 is stored in memory 24. Once compressed, the adaptive filter and attenuation stage 42 filters the input audio signal that has been compressed, if compression was applied, by selecting the selectable audio response filter data from memory 24 based on a given volume level as determined from volume control signal 20.

Figure 3:
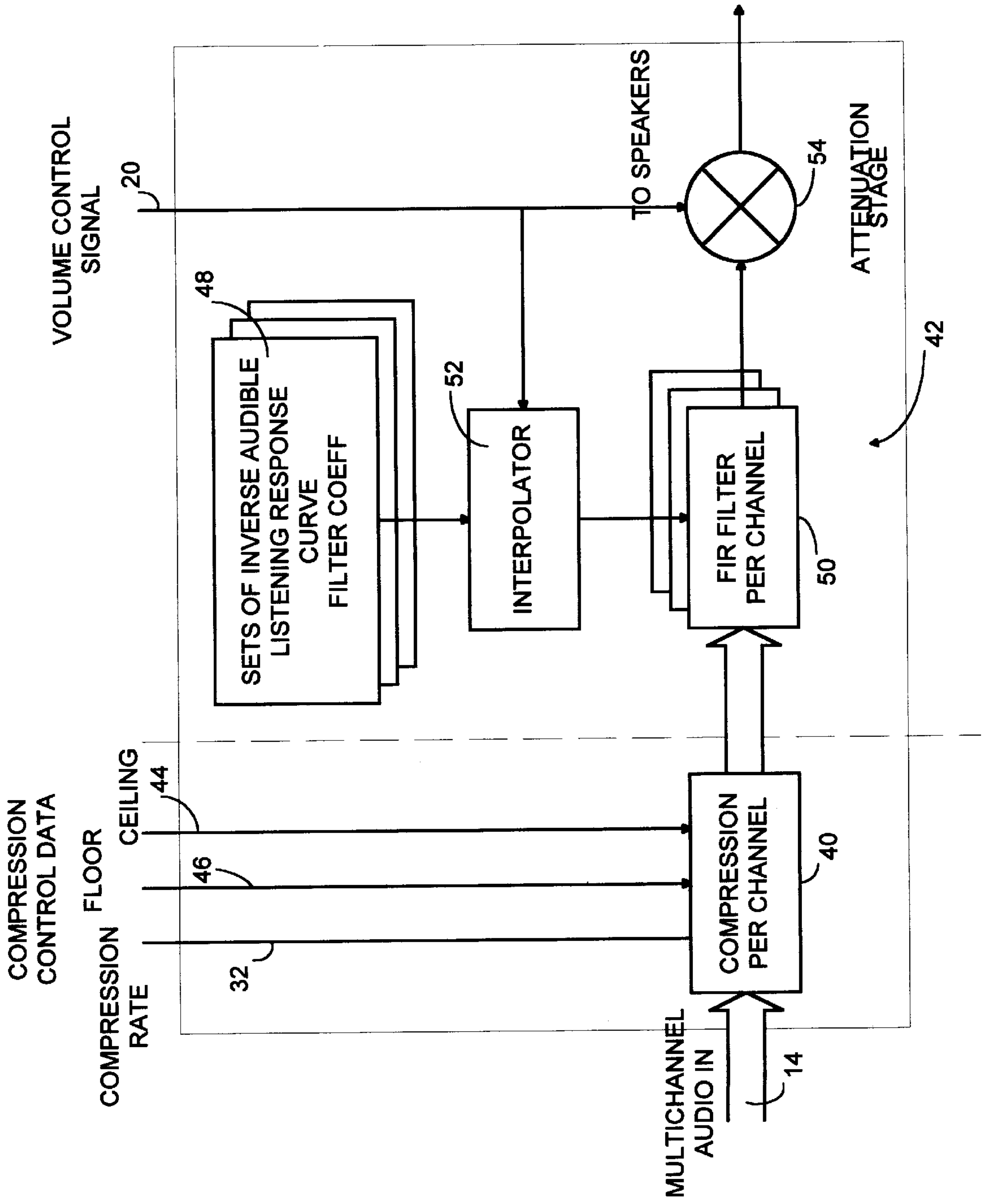
FIG. 3 is block diagram generally depicting one embodiment of an adaptive compression and adaptive filter and attenuation system in accordance with one embodiment of the invention.

FIG. 3 shows in more detail the adaptive compression stage 40 and the adaptive filter and attenuation stage 42. The adaptive compression stage 40 varies the magnitude level of the audio channel input 14 based on a current magnitude level of the received multichannel audio in response to varying listening environment data (compression control data 22) when compression is desirable. The adaptive filter and attenuation stage 42 adaptively changes the magnitude of the multichannel audio signals based on frequency of the signals as opposed to a magnitude of the signals in response to changes in volume level control data 20. As shown, the adaptive compression stage 40 receives ceiling threshold data 44, floor level data 46 and the compression rate data 32 for use in initially compressing multichannel audio 14. The multimedia computer, through control stage 16, determines the ceiling and the floor levels based on the listening environment data. The compression rate data 32 may be stored in memory 24 but may also be variable by a user through a user interface if desired.

The adaptive filter and attenuation stage 42 uses the selectable audio response filter data 26 which is preferably selectable sets of filter coefficients 48 wherein each set of filter coefficients corresponds to an inverse audible listening response curve for the human ear for a specific audio volume level. For example, sets of filter coefficients 48 generate an inverse response for each of a family of Fletcher-Munson curves. These filter coefficients are stored in memory 24. Each set of inverse audible listening response curve filter coefficients 48 is stored corresponding to a volume level. The volume control signal 20 is indicative of the current volume setting and is used by the adaptive filter and attenuation stage 42 to determine which of the sets of inverse audible listening response curve filter coefficients 48 should be selected. A series of finite impulse response filters (FIR) 50 serve as the filter portion of the adaptive filter and attenuation stage 42. Preferably, a separate filter is used for each audio channel. However, it will be recognized by one of ordinary skill in the art that other configurations may also be used.

When a set of selectable coefficients 48 corresponds directly to the level of the volume as indicated by the volume control signal 20, those coefficients are tapped by the corresponding FIR filter for that channel to adaptively compress (filter) the input audio channel to be better heard by an ear. Where a set of inverse audible listening response curve filter coefficients 48 does not correspond directly to current volume control setting, an interpolator 52 interpolates coefficients from adjacent sets of inverse audible listening response curve filter coefficients 48 to generate an appropriate set of inverse audible listening curve response filter coefficients for that particular volume setting. Hence, the interpolator 50 interpolates additional filter coefficients from the plurality of selectable sets of filter coefficients in response to the volume control signal 20.

Figure 4:
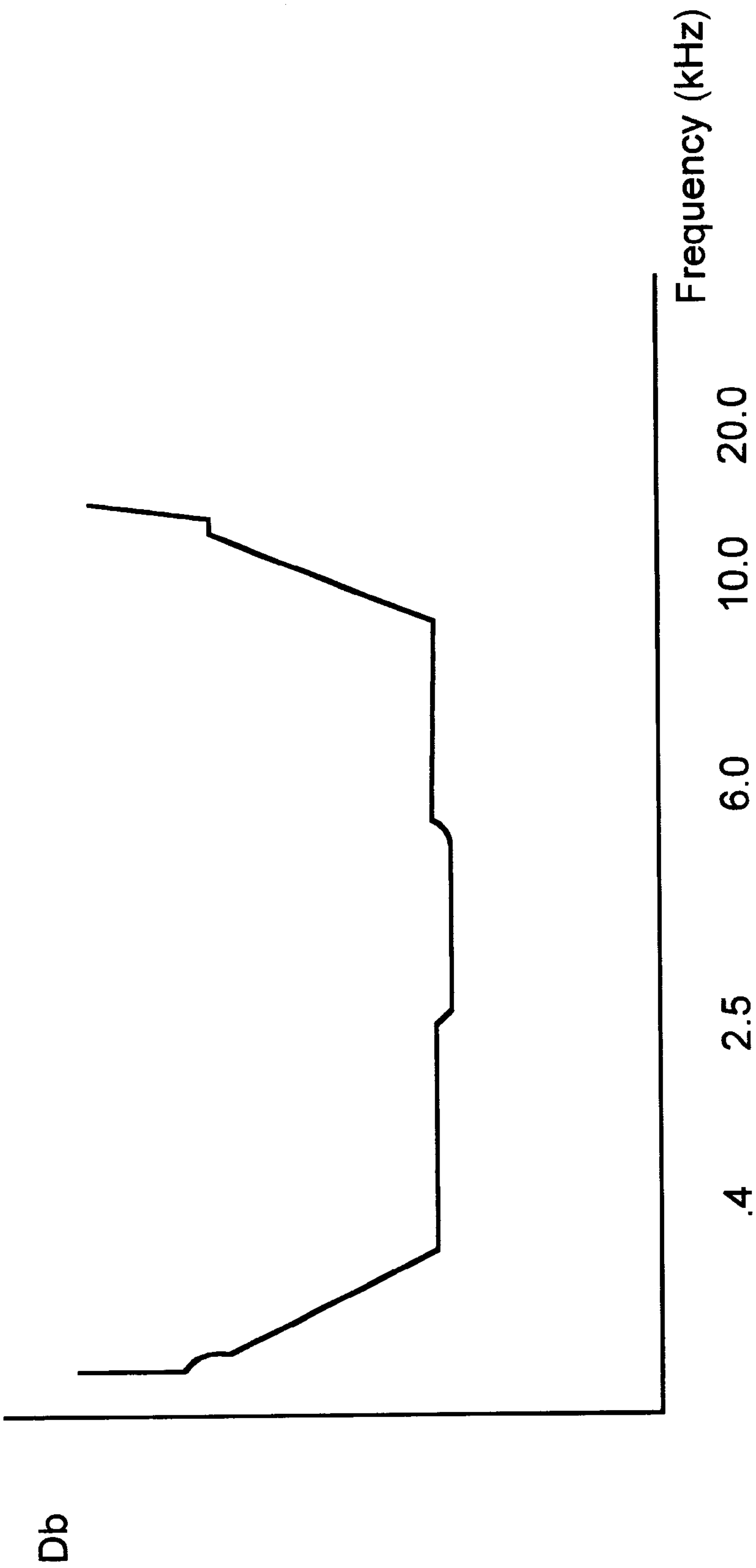
FIG. 4 is an illustrative example of a Fletcher-Munson curve for use in determining adaptive filter coefficients for use in one embodiment of the invention.

FIG. 4. illustrates generally, a Fletcher-Munson type curve (but not exact Fletcher-Munson curve) for a specified volume level. The stored filter coefficients 48 are those that generate an inverse response of the input audio signals compared to the Fletcher-Munson curves. Since storing Fletcher-Munson curve data for every recorded volume level would require a prohibitive amount of memory, intermediate curves or coefficients to effect an inverse response to the intermediate curves are interpolated from existing filter coefficients using standard linear interpolation methods.

The filter stage 42 performs filtering on each audio sample for each channel based on the following formula:

$$y(t) = \sum_{i=0}^{N-1} x(i) * \text{coeff}(i)$$

where N=the number of coefficients, x(i) is one digital audio sample from one channel of audio and coeff(i) is the corresponding filter coefficient.

Once the FIR filters 50 filter the multichannel audio, the filtered output audio is attenuated by attenuator 54 to vary the volume level of the audio signals to correspond to the set volume control setting from volume control signal 20. After being attenuated, the filtered multichannel audio signals are sent to a multichannel speaker driver which transmits the compressed and filtered audio to the appropriate speakers.

Figure 5A:
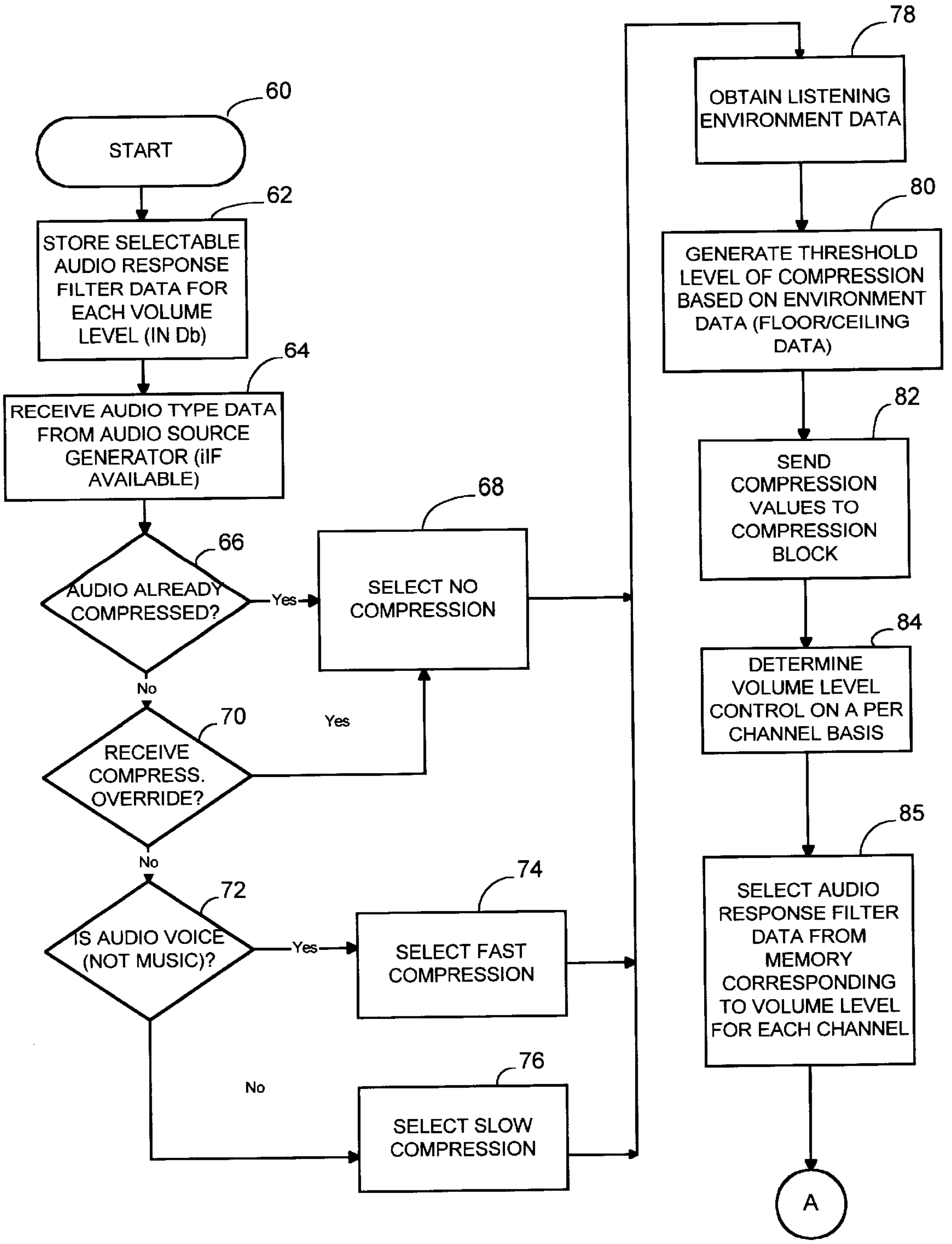
FIGS. 5*a* and 5*b* are a flowchart depicting an adaptive audio signal compression method in accordance with one embodiment of the invention.
Figure 5B:
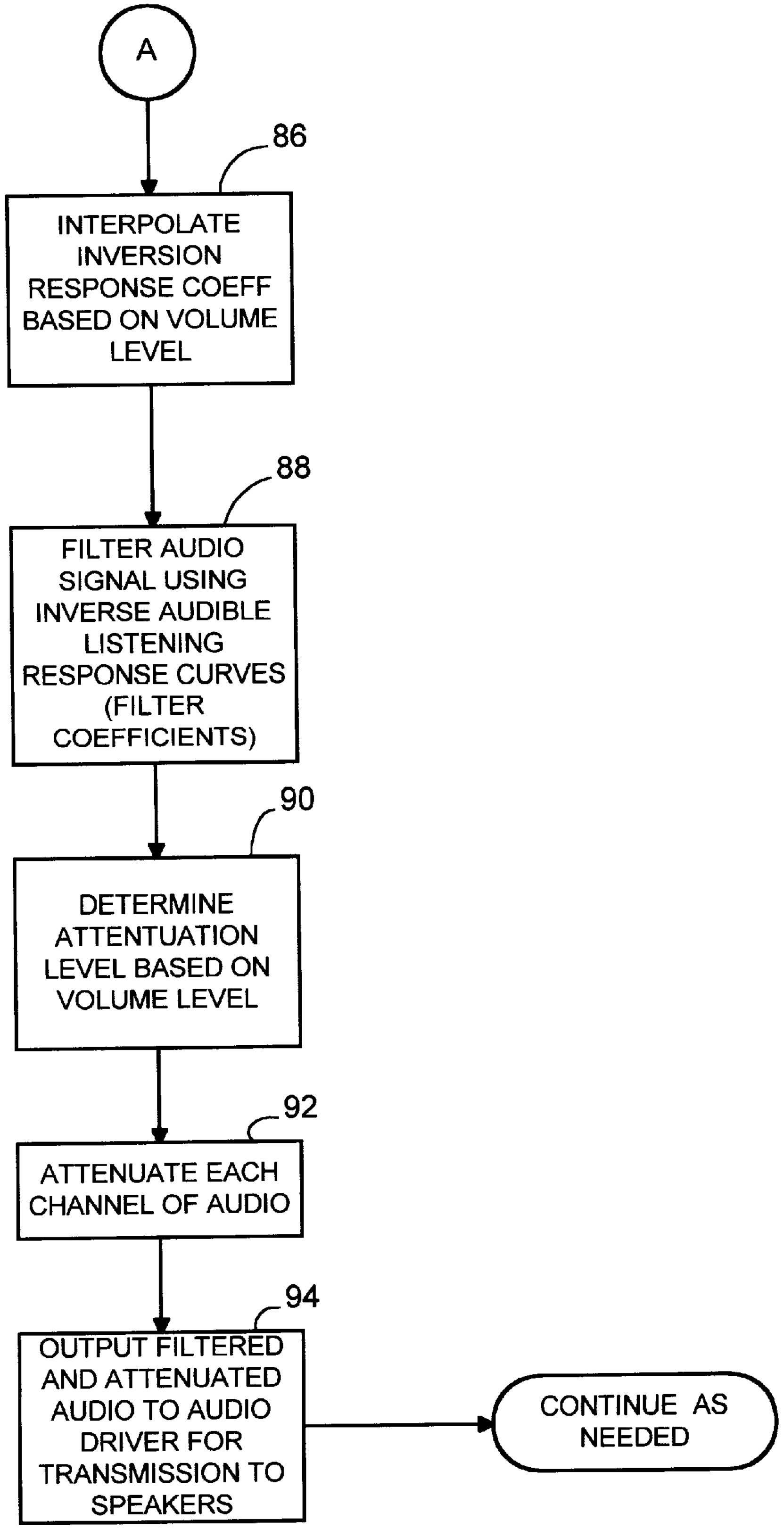

FIGS. 5*a* and 5*b* show a method of operation of the system 10 starting with initialization of the system in block 60. The computer stores the selectable audio response filter data 26 for each specified volume level such as filter coefficients that generate the inverse of the family of Fletcher-Munson curves. This is shown in block 62. The control stage 16 receives the audio type data 18 from the audio source driver 12 if the audio type data 18 is available. For example with DVD formats such as AC-3, header information will indicate whether the contents of the DVD contain movies recorded in multichannel format or in the case of a CD, whether the CD contains music or audio. This is shown in block 64. Based on the audio type data, the control stage determines whether the input audio stream 14 has already been compressed as shown in block 66. This may be determined by analyzing audio type format data in a header of an audio stream, or can be set by the user through a graphical user interface. If the input audio has already been compressed, the control stage 16 disables the compression block 40 so that no compression occurs as indicated in block 68. If the audio has not already been compressed, the control stage 16 determines whether it has received a compressed override signal 70 as part of the compression control data 22. A compression override signal is generated by the control stage 16, or by the user through a graphical user interface and may occur if the type of data is determined to be high definition audio, or when the user wants to ensure the integrity of the source signal.

As shown in block 72, the control stage 16 determines whether the input is audio (e.g., voice versus music) based in the audio type data, or by the source of the data (e.g., telephone line versus CD player) or by user input. In response to the audio type data, if the audio input is voice, the control stage 16 generates a rate compression control signal 32 to control the compression stage 40 through compression rate signal 32 to facilitate fast compression as shown in block 74. Fast compression may be used with voice since the added distortion caused by a fast rate of change in magnitude for voice content is not readily detected by the listener.

If the audio input stream contains music however, the control stage 16 sends the compression rate data 32 to command the compression block 40 to perform slow compression as shown in block 76. Fast and slow compression refers to the amount of time before signal compression commences for a given audio channel. Put another way, the rate at which the compression block 40 compresses the input data stream when it varies beyond the floor and ceiling levels as represented by floor and ceiling data 44 and 46.

Once the compression rate has been set, the control stage 16 obtains the listening environment data 22 as input by the user as shown in block 78. Based on the listening environment data 22, the control stage 16 determines the threshold level of compression as shown in block 80. In other words, the controller stage 16 sets the floor and ceiling levels for the compression stage 40. These thresholds are preferably stored in memory 24. The floor and ceiling levels 44 and 46 along with the compression rate data 32 are sent to the compression stage 40 to control the rate and the amount of compression as shown in block 82.

The adaptive filter stage 42 determines the volume level control on a per channel basis based on the volume control signal 20 as shown in block 84. Once the volume control level has been determined, the adaptive filter stage 42 selects the associated inverse audible listening response curve filter coefficients 48 for the FIR filter 50 based on the volume level for each channel as shown in block 85. Where the volume level is in between volume levels corresponding to the stored sets of inverse audible listening response curve coefficients 48, the adaptive filter stage 42 interpolates the necessary inversion response coefficients using interpolator 52 based on the determined volume level as shown in block 86.

The corresponding FIR filter 50 for a channel receives the inverse audible listening response curve filter coefficients 48 stored in memory 24 or those generated by interpolator 52 and filters the audio signal for the channel using the inverse audible listening response curve filter coefficients as shown in block 88. This is done for each channel. In this way the audio signal is adaptively compressed and modified so that frequencies normally sounding faint will sound as though they are at the same level as those that the ear normally does not attenuate.

If the volume control signal varies so that attenuation must be performed, the adaptive filter stage 42 determines the attenuation level based on the volume level from signal 20. This is shown in block 90. The attenuator 54 modifies the gain of the filtered audio with the volume level to reduce or increase the decibel level of the filtered audio signals. It will be recognized by one of ordinary skill in the art that the attenuation may occur within the FIR filter 50 or in any other suitable block. Once the attenuation level has been determined, the attenuator 54 attenuates each channel of audio as shown in block 92. The control stage 16 then outputs the compressed audio (compressed, filtered and attenuated audio) to the audio driver 34 for transmission to speakers 36 as shown in block 94. The above processes continue for each channel of audio and each audio type from the external audio source.

In yet another embodiment, the control stage and adaptive compression stage uses the coefficients representing the inverse of the listening response curves to simulate the limitations of the ear in a virtual environment instead of compensating for the limitations of the ear. In a virtual simulation environment, the computer, under control of a software application, changes volume levels to denote the changing distance of sound sources relative to the observer. For example, when a sound source is moving away from the observer, the volume level is reduced. However, in a real world situation, the volume would actually be perceived as reduced in accordance with the Fletcher-Munson curves. With this embodiment, the inverse of the Fletcher-Munson curves as defined previously are used to more accurately simulate distance cues of sound sources in a virtual environment.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. An adaptive audio signal compression computer system comprising:

means for storing selectable audio response filter data representing a plurality of predetermined ear response data;

means, operatively coupled to the means for storing, for adaptively compressing the range of volumes of an input audio stream by selecting the selectable audio response filter data for use in varying audio signal volume compression parameters; and wherein the means for adaptively compressing the range of volumes is responsive to audio listening room environment data and determines a volume compression threshold level based on the audio listening room environment data.

2. The computer system of claim 1 wherein the means for storing contains data representing sets of filter coefficients corresponding to a plurality of inverse audible listening response curves.

3. The computer system of claim 2 wherein the data representing the sets of filter coefficients includes a plurality of selectable sets of filter coefficients wherein each set of filter coefficients corresponds to an inverse audible listening response curve for a predetermined audio volume level.

4. The computer system of claim 3 wherein the means for adaptively compressing the range of volumes of the input audio stream includes means for interpolating additional filter coefficients from the plurality of selectable sets of filter coefficients in response to a volume control signal.

5. The computer system of claim 1 wherein the means for adaptively compressing the range of volumes of the input audio stream includes means for filtering the input audio signal by selecting the selectable audio response filter data based on a given volume level.

6. The computer system of claim 5 wherein the means for adaptively compressing the range of volumes of the input audio stream further includes means for compressing the range of volumes of the input audio stream prior to filtering by the means for filtering wherein the means for compressing the range of volumes receives maximum volume compression ceiling data for a room environment and minimum volume compression floor data for a room environment to facilitate control of compression.

7. The computer system of claim 1 wherein the means for adaptively compressing the input audio stream is operatively coupled to receive a volume compression control signal and adaptively compresses a range of volumes of a digital multichannel input audio stream in response to the volume compression control signal and is also a component in a multimedia computer system.

8. The computer system of claim 1 wherein the means for adaptively compressing a range of volumes of the input audio stream is operatively coupled to means for outputting the compressed audio to a plurality of speakers.

9. The computer system of claim 1 further including means for providing audio source type data representing at least one of a plurality of different audio sources that provides the audio input stream, to the means for adaptively compressing a range of volumes of the input audio stream and wherein the means for adaptively compressing a range of volumes of the input audio stream generates a volume compression control signal in response to the source type data.

10. The computer system of claim 9 wherein the volume compression control signal includes compression rate data representing an amount of time before signal volume compression commences for a given audio channel based on maximum volume compression ceiling data for a room environment and minimum volume compression floor data for a room environment.

11. An adaptive audio signal compression computer system comprising:

means for storing selectable audio response filter data representing a plurality of predetermined ear response data including a plurality of selectable sets of filter coefficients wherein each set of filter coefficients corresponds to an inverse audible listening response curve for a predetermined audio volume level;

means, operatively coupled to the means for storing, for adaptively compressing a range of volumes of an input audio stream by selecting the selectable audio response filter data for use in varying audio signal compression parameters having means for filtering the input audio signal by selecting the selectable audio response filter data based on a given volume level and wherein the means for adaptively compressing the range of volumes is responsive to audio listening room environment data and determines a volume compression threshold level based on the audio listening room environment data; and means for providing audio source type data to the means for adaptively compressing the input audio stream, wherein the means for adaptively compressing a range of volumes of the input audio stream generates a volume compression control signal in response to the source type data.

12. The computer system of claim 11 wherein the means for adaptively compressing the range of volumes of the input audio stream further includes means for compressing the range of volumes of the input audio stream prior to filtering by the means for filtering wherein the means for compressing the range of volumes receives maximum volume compression ceiling data for a room environment and minimum volume compression floor data for a room environment to facilitate control of volume compression.

13. The computer system of claim 12 wherein the means for adaptively compressing the range of volume levels adaptively compresses a digital multichannel input audio stream, that is not data compressed, in response to the volume compression control signal is also a component in a multimedia computer system.

14. The computer system of claim 12 wherein the means for adaptively compressing the range of volumes of the input audio stream is operatively coupled to means for outputting the compressed audio to a plurality of speakers.

15. The computer system of claim 11 wherein the means for adaptively compressing a range of volumes of the input audio stream includes means for interpolating additional filter coefficients from the plurality of selectable sets of filter coefficients in response to a volume control signal.

16. The computer system of claim 11 further including means for providing audio source type data to the means for adaptively compressing the range of volumes of the input audio stream and wherein the means for adaptively compressing the range of volumes of the input audio stream generates a volume compression control signal in response to the source type data.

17. An adaptive audio signal compression method comprising:

storing selectable audio response filter data representing a plurality of predetermined ear response data;

adaptively compressing the range of volumes of an input audio stream by selecting the selectable audio response filter data for use in varying audio signal compression parameters by at least determining a volume compression threshold level based on the audio listening room environment data.

18. The method of claim 17 wherein the step of storing includes storing data representing a set of filter coefficients corresponding to a plurality of inverse audible listening response curves.

19. The method of claim 18 wherein the data representing the set of filter coefficients includes a plurality of selectable sets of filter coefficients wherein each set of filter coefficients corresponds to an inverse audible listening response curve for a predetermined audio volume level.

20. The method of claim 19 wherein the step of adaptively compressing the range of volumes of the input audio stream includes interpolating additional filter coefficients from the plurality of selectable sets of filter coefficients in response to a volume control signal.

21. The method of claim 17 wherein the step of adaptively compressing the range of volumes of the input audio stream includes filtering the input audio signal by selecting the selectable audio response filter data based on a given volume level.

22. The method of claim 19 wherein the step of adaptively compressing the range of volumes of the input audio stream further includes compressing the range of volumes of the input audio stream prior to filtering and receiving maximum volume compression ceiling data for a room environment and minimum volume compression floor data for a room environment to facilitate control of compression.

23. The method of claim 17 wherein the step of adaptively compressing the range of volumes of the input audio stream includes receiving a compression control signal and adaptively compressing a digital multichannel input audio stream in response to the compression control signal and the method is carried out by a multimedia computer system.

24. The method of claim 17 further including outputting the compressed audio to a plurality of speakers.

25. The method of claim 17 further including the step of providing audio source type data and wherein the step of adaptively compressing the input audio stream generates a volume compression control signal in response to the source type data.

* * * * *